(12) United States Patent
Hermey et al.

(10) Patent No.: US 11,761,514 B2
(45) Date of Patent: Sep. 19, 2023

(54) LINE GUIDE DEVICE FOR CLEAN ROOM APPLICATIONS

(71) Applicant: IGUS GMBH, Cologne (DE)

(72) Inventors: Andreas Hermey, Hennef (DE); Dominik Barten, Meckenheim (DE)

(73) Assignee: IGUS GMBH, Cologne (DE)

( * ) Notice: Subject to any disclaimer, the term of this patent is extended or adjusted under 35 U.S.C. 154(b) by 100 days.

(21) Appl. No.: 17/595,866

(22) PCT Filed: May 28, 2020

(86) PCT No.: PCT/EP2020/064894
§ 371 (c)(1),
(2) Date: Nov. 29, 2021

(87) PCT Pub. No.: WO2020/239938
PCT Pub. Date: Dec. 3, 2020

(65) Prior Publication Data
US 2022/0228645 A1 Jul. 21, 2022

(30) Foreign Application Priority Data
May 29, 2019 (DE) ...................... 20 2019 103 068.2

(51) Int. Cl.
*F16G 13/16* (2006.01)
(52) U.S. Cl.
CPC .................................. *F16G 13/16* (2013.01)
(58) Field of Classification Search
CPC .... F16G 13/16; F16L 3/00; F16L 3/12; H02G 11/006

(Continued)

(56) References Cited

U.S. PATENT DOCUMENTS

| 6,708,480 | B1 * | 3/2004 | Wehler | ................... | F16G 13/16 |
| | | | | | 59/78.1 |
| 7,204,075 | B2 * | 4/2007 | Utaki | ..................... | F16G 13/16 |
| | | | | | 59/78.1 |

(Continued)

FOREIGN PATENT DOCUMENTS

| DE | 7615945 | 9/1976 |
| DE | 4015803 | 11/1991 |

(Continued)

OTHER PUBLICATIONS

International Search Report from corresponding PCT Appln. No. PCT/EP2020/064894, dated Aug. 20, 2020.

*Primary Examiner* — Todd M Epps
(74) *Attorney, Agent, or Firm* — Grossman, Tucker, Perreault & Pfleger, PLLC

(57) ABSTRACT

A line guide device for lines in a clean room application, comprising an elongate, flexible envelope which is displaceable to-and-fro between a first connection point and a second connection point movable relative thereto, forming a deflection arc between two runs. The envelope has at least one undoable and reclosable connection region, for insertion or removal of a line when the connection region is open. The envelope, when closed, surrounds in dust-tight manner an inner space for accommodating one or more lines. A functional material is provided within the envelope to reduce the number of free particles in the inner space. The functional material may retain operationally released particles in the inner space and/or counteract the operational release of particles in the inner space.

14 Claims, 2 Drawing Sheets

(58) Field of Classification Search
USPC .......................................................... 248/49
See application file for complete search history.

(56) References Cited

U.S. PATENT DOCUMENTS

| | | | |
|---|---|---|---|
| 10,591,089 B2 * | 3/2020 | Barten | .................... F16L 3/015 |
| 2003/0000198 A1 | 1/2003 | Hermey et al. | |
| 2015/0159733 A1 | 6/2015 | Blase et al. | |
| 2016/0061290 A1 | 3/2016 | Hermey et al. | |

FOREIGN PATENT DOCUMENTS

| | | | |
|---|---|---|---|
| DE | 102007008647 | 8/2008 | |
| WO | 02086349 | 10/2002 | |
| WO | 2012131033 | 10/2012 | |
| WO | 2014147196 | 9/2014 | |
| WO | 2016042134 | 3/2016 | |
| WO | WO-2016042134 A1 * | 3/2016 | ............. F16G 13/16 |

* cited by examiner

LINE GUIDE DEVICE FOR CLEAN ROOM APPLICATIONS

FIELD

The invention relates in general to a line guide device for clean room applications which is configured for dynamic and protected guidance of supply lines, such as for example cables, hoses or the like, in a clean room application. A generic line guide device comprises an elongate, flexible envelope which is displaceable to-and-fro between a first connection point and a second connection point movable relative thereto. The line guide device may typically form two runs with an interposed displaceable deflection arc with specified minimum radius and travel for example in a vertical plane or in linear manner.

BACKGROUND

Apparatus used in clean rooms should discharge as few particles as possible to the surroundings during operation, and this relates particularly to mobile apparatus. With regard to line guide devices, WO 02/086349 A1 and, as a further development, WO 2012/131033 A1 proposed as line guide devices energy guide chains suitable for clean rooms which minimize abrasion-related release of particles by the energy guide chain.

However, as a result of the required to-and-fro motion, not only the line guide device but also the guided lines themselves release particles over the course of the period of operation. A line guide device improved in this respect was proposed by the applicant in WO 2016/042134 A1. The line guide device described therein (with reference to FIGS. 3A-3D and 12-16 of said WO 2016/042134 A1) is obtainable from the applicant under the tradename "e-skin".

This generic line guide device has an envelope, consisting of opposing shell parts, with two opposing, undoable and reclosable connection regions, for insertion or removal of a line when open. When closed, the envelope surrounds the internal inner space, which serves to receive one or more lines, in dust-tight manner Thus, no particles with particle sizes critical for clean room applications can exit during operation. The envelope itself is also optimized for clean room use.

A considerable advantage over other previously known solutions consists in the fact that the line guide device can be opened in order, if necessary, to renew individual lines, i.e. the line guide device does not have to be completely replaced together with all the lines.

If such a line guide device or a comparable line guide device is opened for maintenance purposes, for example to replace a defective line, particles which have been released operationally in the inner space over the previous period of operation, in particular from the lines, may enter the surrounding environment, i.e. the clean room. Such contamination requires complex cleaning measures or prolongs downtimes and is thus obviously undesirable.

SUMMARY

A first object of the present invention is therefore to propose a line guide device improved with regard to the above-mentioned contamination problem.

In the case of a line guide device, the object is achieved simply by providing a functional material within the envelope which serves or is effective in reducing the number of free particles in the inner space.

The reduction achieved according to the invention is to be understood in relative terms and relates to a comparison measurement carried out, in each case by aspiration of the inner space, after an identical operating period on a line guide device according to the invention and on a line guide device structurally identical thereto and with identical line filling but without functional material in the inner space. In this case, in particular the number and size of the particles per unit air may be measured according to standard DIN EN ISO 14644-1.

The reduction may in particular be achieved by two modes of action, namely by using a functional material which as it were captures or retains particles released operationally in the inner space and/or by using a functional material which counteracts the operational release of particles in the inner space, in particular by lines to be guided. The invention likewise encompasses the use of one functional material which achieves both modes of action or indeed a combination of two materials each having one of these effects.

The at least one functional material may in this case in particular be arranged or mounted separately or in addition to the actual envelope and the lines to be accommodated in the inner space.

The envelope surrounds the inner space of the line guide device in dust-tight manner both lengthwise between the two ends and in the circumferential direction. The dust-tight envelope effectively prevents particles from escaping when closed. In the present context, dust-tight does not necessarily mean hermetically gas-tight or sealed in such a way that nothing can penetrate or escape. Rather, dust-tight means technically impermeable to the escape of particles of particle sizes critical to clean room applications, which arise for example in the case of conventional solutions through friction, abrasion or motion.

For the purposes of the invention, there are different options for introducing the generally particle-reducing functional material. An insert, an inlay, a layer, a filling, a padding or the like which comprises the particle-reducing functional material or consists integrally thereof may to this end be provided in the inner space.

Alternatively or in addition, a coating of the functional material may also be provided at least in places on the inner wall of the envelope.

In one embodiment, a functional inlay is provided in the form of a fibrous structure, in particular of a nonwoven, with a particle-attracting action and/or adhesive action. In particular, a fibrous structure with electrostatic action, preferably with polymer fibers, may be provided as functional material. An electrostatic charge, which has an attractive action with regard to particles, may in this case be achieved or maintained by operational motion of the nonwoven or the fibrous structure relative to the envelope and/or guided lines. Suitable nonwovens are known for cleaning purposes, for example. Microfibers of polyethylene and/or polyester may be considered. The fibrous structure may be provided with a coating, of pressure-sensitive adhesive for example, which is permanently tacky and intensifies the adhesive action, or allows the particles to adhere to the fibers even on decay of the electrostatic charge.

The functional material may in particular comprise a pressure-sensitive adhesive, for example based on natural or synthetic rubber or acrylates, or indeed based on polyurethanes and silicones. A suitable pressure-sensitive adhesive should have a permanent surface tackiness (tack) over an extended period of operation (and within the application temperature ranges).

In one further embodiment, a gel, a closed-cell foam and/or a pressure-sensitive adhesive, may be introduced at least in places into the envelope as functional material. In this case, the functional material may in particular be introduced as a high-viscosity functional filling or functional layer. A filling does not in this case have completely to fill the free inner space (without lines) cross-sectionally and/or lengthwise.

A corresponding functional material, in particular a gel or foam or pressure-sensitive adhesive preferably has an adhesive action or permanent tackiness, at least under intended ambient or operating conditions, in particular at temperatures in the range from 5° C.-60° C., at least from 10° C. to 50° C.

Alternatively or in addition, a functional layer with particle-reducing functional material may be applied merely in places, in particular on the inner wall of the envelope. Preferably, a material separate from the envelope and the lines, i.e. not a coating bonded to the envelope inside or line outside(s), is used as functional material.

It is possible, as an example of a functional material which counteracts operational release of particles in the inner space, in particular by lines to be guided, additionally or alternatively to provide a friction coefficient-reducing tribopolymer. To keep the structure simple, this may be provided as a functional inlay or sliding film, in particular between adjacent lines, for example centrally on the neutral axis or indeed toward the outside between lines and the inner wall of the envelope.

A solution which is simple in structural or manufacturing terms consists in arranging at least one elongate, tape-like functional insert or at least one elongate, tape-like functional inlay in the inner space. In this case, an existing envelope, for example according to FIGS. 3A-3D or 12-16 of WO 2016/042134 A1 may be used without modification.

A suitable functional material may be provided in the inner space at least over a great majority of the length of the envelope, and this also continuously or without interruption between two connection points depending on the arrangement within the accommodation space. Provision may however also be made, for example in the case of the use of separating webs for partitioning the interior, for the functional material to be distributed with interruptions in places in the lengthwise direction, for example as tape-like individual strips.

For example, precisely one functional insert, one functional inlay, one functional layer etc. may be provided with functional material at the height of the neutral axis in the envelope or indeed for example two functional inserts, functional inlays etc., which are provided in the envelope in such a way that they are opposite one another relative to the neutral axis.

The functional material preferably forms at least one functional surface which faces the inner space and/or lines to be guided and for example has a particle-retaining or adhesive and/or friction coefficient-reducing mode of action.

To simplify maintenance work, the functional material is embodied so as to be detachable from the inside of the envelope and/or from the lines to be guided, in particular readily detachable by hand or without using a tool.

The functional material is preferably provided in a reusable format, for example with detachable insert, inlay etc.

With regard to the reclosable connection or a corresponding closure, the connection region preferably has two closure strips continuous in the lengthwise direction and having meshing profiles. These may interact in the manner of a pressure closure, sliding closure or the like and enable opening of the envelope over the entire length thereof, wherein the closure strips are preferably arranged at substantially neutral axis height.

In one preferred embodiment, a line guide, in accordance with the principle of FIGS. 3A-3D or 12-16 of WO 2016/042134 A1, is fitted or retrofitted according to the invention with functional material, for example in one of the above embodiments. In this case, the envelope is undoably assembled in portions of in each case two opposing shell parts of plastics material, in particular of two shell parts with different corrugated profiles. The shell portions connected together in the lengthwise direction here delimit a continuous inner space, in which the functional material is provided.

BRIEF DESCRIPTION OF THE DRAWINGS

Further features and advantages of the invention may be inferred without limitation of the scope of protection from the following description of a number of preferred exemplary embodiments made on the basis of the appended figures, in which.

DETAILED DESCRIPTION

Figure 3:
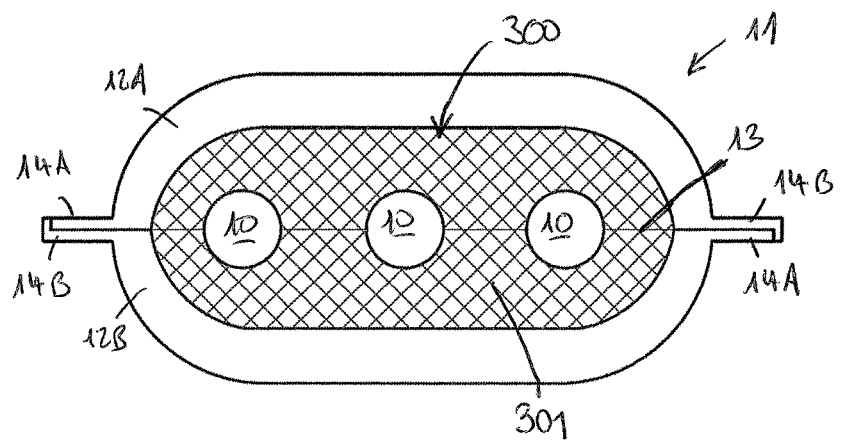
FIG. 3 shows a schematic cross-section through a line guide device according to a third exemplary embodiment.
Figure 4:
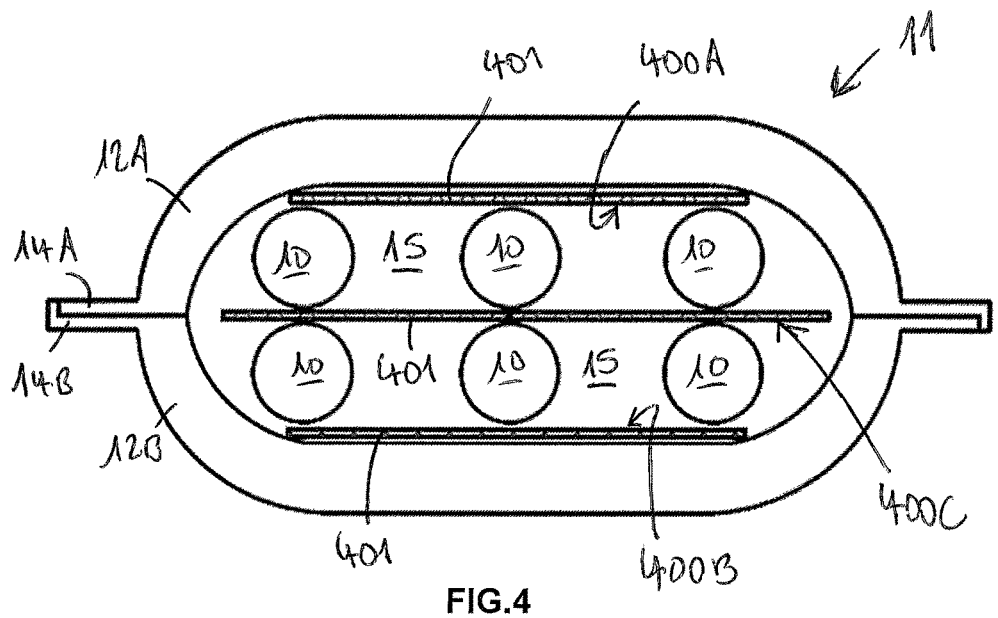
FIG. 4 shows a schematic cross-section through a line guide device according to a fourth exemplary embodiment
Figure 5A:
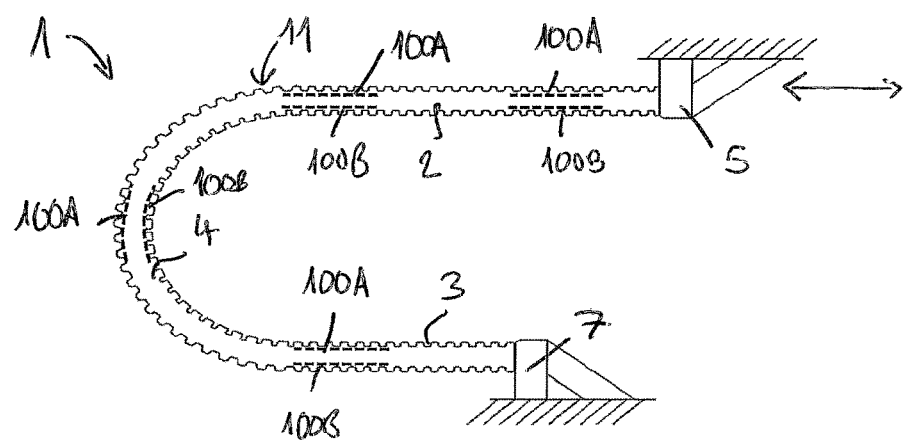
FIG. 5A & FIG. 5B show schematic longitudinal sections for clarifying the arrangement of a functional material relative to the longitudinal direction of the line guide device.
Figure 5B:
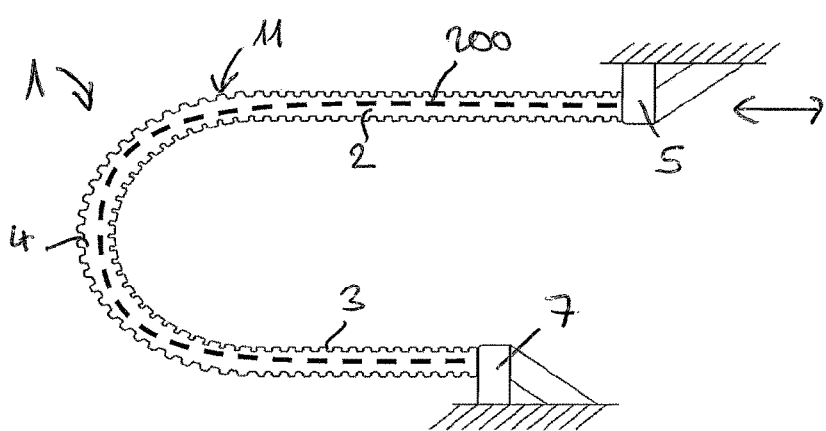

FIGS. 1-4 and FIGS. 5A-5B are schematic representations of a line guide device 1 (FIGS. 5A-5B). This serves in protected guidance of cables, hoses or similar lines, denoted in general as 10 (cf. FIGS. 1-4). Between an upper run 2 and a lower run 3, the line guide device 1 variably or dynamically forms a deflection arc 4 with specified curvature about a deflecting axis. To avoid line breaks, the deflection arc 4 in particular has a specified, minimum radius of curvature and in this way ensures the radii of curvature do not fall below admissible radii of curvature for the guided lines 10. The deflection arc 4 travels over a distance relative to the stationary connection 5 together with the connection 7, which is here movable in linear manner for example, here for example in a vertical plane. In the example shown, the mobile connection 5 is located by way of example on the upper run 2 and the stationary connection 7 on the lower run 3. The upper run 2 is preferably self-supporting, i.e. has a self-supporting length.

The line guide device 1 has an envelope 11, which is embodied in the manner of a corrugated hose and has a corrugated profile, which on the one hand provides flexibility and on the other hand predetermines the radius of the deflection arc 4. The envelope 11 as such is embodied according to WO 2016/042134 A1, namely FIGS. 12-16 therein, i.e. assembled in portions of two joined-together shell parts 12A, 12B.

The shell parts 12A, 12B consist of a resilient plastic with long-term bending resistance, and are preferably injection molded from thermoplastic material.

The shell parts have connecting strips 14A, 14B on both sides, arranged in each case opposingly on the neutral axis 13 (cf. FIG. 3), for example with teeth according to WO 2016/042134 A1. The connecting strips 14A, 14B form an undoable and reclosable connection region on both sides. In this way, the envelope 11 may be opened laterally over the entire length for insertion or removable of lines. The connecting strips 14A, 14B act as a dust-tight closure.

When closed, the envelope 11 defines or delimits a continuous inner space 15 in dust-tight manner lengthwise and in the circumferential direction. The inner space 15 serves to accommodate a plurality of lines 10. In relation to further structural details of the envelope 11, the teaching of WO 2016/042134 A1 (in particular FIGS. 12-16 therein) is here incorporated for the sake of brevity.

Figure 1:
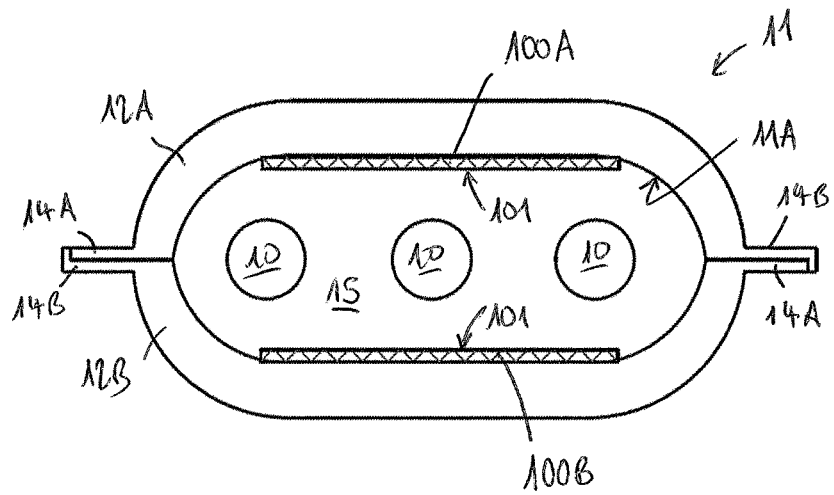
FIG. 1 shows a schematic cross-section through a line guide device according to a first exemplary embodiment.

In the exemplary embodiment according to FIG. 1, to reduce the number of free particles in the inner space 15, two opposing tape-like functional inlays 100A, 100B are provided in places, which have a thin, flexible backing (not shown) with as functional face a functional material 101 on the surface facing the inner space. The functional material 101 may here for example take the form of a suitable pressure-sensitive adhesive or the like and has an adhesive action or tack with regard to clean room-critical particles released operationally in the inner space. It should be assumed that released particles move quasi-chaotically in the inner space on displacement of the line guide device 1, such that over a sufficiently long period the great majority of the particles are "captured" by the functional material 101 of the functional inlays 100A, 100B and remain adhered thereto. Thus, particles can no longer escape on opening. The functional inlays 100A, 100B may be provided over a great majority of the length of the line guide device 1, here on the inner wall of the envelope 11, or distributed lengthwise over a smaller proportion, as shown schematically in FIG. 5A, such that less weight is added and the cost of materials minimized.

Figure 2:
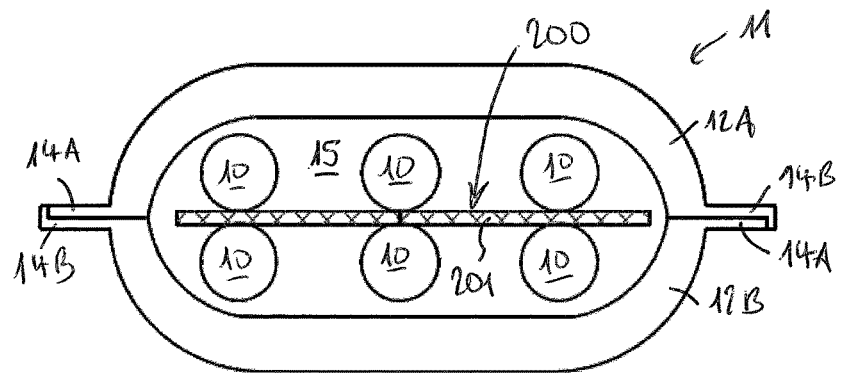
FIG. 2 shows a schematic cross-section through a line guide device according to a second exemplary embodiment.

In the variant of FIG. 2, a nonwoven with an electrostatically attracting action with regard to free dust particles is provided as functional inlay 200. The functional inlay 200 and/or adhesive action is provided. Microfibers, for example of polyethylene and/or of polyester, may here be used as functional material 201 in the nonwoven, preferably with a tacky coating for example of a pressure-sensitive adhesive or the like. The functional inlay 200 in FIG. 2 is arranged centrally, in particular at neutral axis height 13, and may extend continuously for example according to FIG. 5B over the entire length of the line guide device 1 or envelope 11. A further advantage of this arrangement consists in the fact that friction may be avoided between lines 10 which, as in FIG. 2, are not arranged at neutral axis height 13 (longitudinal plane which does not undergo any length modification in the deflection arc 4) and abrasion is correspondingly further reduced.

In the embodiment according to FIG. 3, a functional filling 300 of a gel 301 is provided as functional material. A preferred gel 301 is durably flowable, such that an incision for replacing a line closes again. In addition, the gel 301 may be embodied with tack or permanent tackiness, so as to retain particles. The gel may take the form for example of a suitable gel from the Relicon® product range from HellermannTyton GmbH (D-25436 Tornesch). Additionally, the lines may be frictionlessly held spaced apart by the gel 301. Alternatively, to reduce weight, a closed-cell, permanently tacky foam may also be used. Mixtures with a pressure-sensitive adhesive may also be considered for achieving an adhesive action or permanent tackiness.

In a further embodiment according to FIG. 4, three elongate functional inlays 400A, 400B, 400C are provided as functional material in the form of sliding films of a friction coefficient-reducing tribopolymer 401. A suitable tribopolymer is obtainable for example under the tradename Iglidur® tribo-tape liner from igus GmbH (D-51147 Cologne). According to FIG. 4, two such functional inlays 400A, 400B may in each case be provided between the inner wall 11A of the envelope 11 and guided lines 10. A further functional inlay 400C is provided centrally roughly on the neutral axis 13. The functional inlays 400A, 400B, 400C of tribopolymer 401 work to combat the cause of operational release of particles in the inner space, namely by largely preventing abrasion between the lines. Accordingly, the functional inlays 400A, 400B, 400C are preferably provided continuously in the lengthwise direction (cf. FIG. 5B).

In an arrangement according to FIG. 4, in addition or as an alternative to one or more of the functional inlays 400A, 400B, 400C, for example in addition to the middle functional inlay 400C, a nonwoven 200 may also be used according to FIG. 2 and/or a pressure-sensitive adhesive 101 may be used according to FIG. 1.

LIST OF REFERENCE SIGNS

1 Line guide device
2 Upper run
3 Lower run
4 Deflection arc
5, 7 Connection point
10 Lines (e.g. supply cables)
11 Envelope
11A Inner wall
12A, 12B Shell part (of the envelope)
15 Neutral axis
14A, 14B Connection strips
15 Inner space
100A, 100B; 200 Functional inlay
101; 201; 301; 401 Functional material
300 Functional filling
400A-400C Functional inlay

The invention claimed is:

1. A line guide device for lines, cables, hoses or the like, in a clean room application, comprising:
   an elongate, flexible envelope which is displaceable to-and-fro between a first connection point and a second connection point movable relative thereto, to form a deflection arc between two runs:
   the envelope having at least one undoable and reclosable connection region, for insertion or removal of a line when the connection region is open; and the envelope, when closed, surrounding in dust-tight manner an inner space for accommodating one or more lines, wherein
   within the envelope, a functional material is provided to reduce a number of free particles in the inner space, wherein the functional material retains operationally released particles in the inner space and/or counteracts the operational release of particles in the inner space.

2. The line guide device as claimed in claim 1, wherein a coating of the functional material is provided at least in places on the inner wall of the envelope.

3. The line guide device as claimed in claim 1, wherein at least one elongate tape-like functional insert or at least one elongate tape-like functional inlay is arranged in the inner space.

4. The line guide device as claimed in claim 1, wherein the functional material is provided in the inner space at least over a great majority of a length of the envelope.

5. The line guide device as claimed in claim 1, wherein the functional material forms at least one functional surface which faces the inner space and/or lines to be guided.

6. The line guide device as claimed in claim 1, wherein the functional material is embodied so as to be detachable from the inside of the envelope and/or from lines to be guided.

7. The line guide device as claimed in claim 1, wherein the connection region has two closure strips continuous in a lengthwise direction with meshing profiles.

8. The line guide device as claimed in claim 7, wherein the envelope is undoably assembled in portions of in each case of two opposing shell parts of plastics material, in particular of two shell parts with different corrugated profiles, which delimit a continuous inner space.

9. The line guide device as claimed in claim 1, wherein a functional insert, a functional inlay, a functional layer or a functional filling which comprises the functional material or consists thereof is provided in the inner space.

10. The line guide device as claimed in claim 9, wherein a fibrous structure, a nonwoven, with particle-attracting action and/or adhesive action, with electrostatic action, is provided as functional inlay.

11. The line guide device as claimed in claim 9, wherein a sliding film of a friction coefficient-reducing tribopolymer is provided as functional inlay.

12. The line guide device as claimed in claim 9, wherein a gel, a closed-cell foam and/or a pressure-sensitive adhesive is introduced into the envelope at least in places as the functional material, a high-viscosity functional filling or functional layer.

13. The line guide device as claimed in claim 12, wherein the gel or the foam or the pressure-sensitive adhesive has an adhesive action or permanent tackiness.

14. The line guide device as claimed in claim 12, wherein a functional layer with particle-reducing functional material is applied in places on the inner wall of the envelope.

* * * * *